United States Patent
Elia

(10) Patent No.: US 9,798,417 B2
(45) Date of Patent: Oct. 24, 2017

(54) THERMAL BASELINE RELAXATION

(71) Applicant: Synaptics Incorporated, San Jose, CA (US)

(72) Inventor: Curtis Elia, San Carlos, CA (US)

(73) Assignee: Synaptics Incorporated, San Jose, CA (US)

(*) Notice: Subject to any disclaimer, the term of this patent is extended or adjusted under 35 U.S.C. 154(b) by 49 days.

(21) Appl. No.: 14/620,045

(22) Filed: Feb. 11, 2015

(65) Prior Publication Data

US 2016/0231860 A1 Aug. 11, 2016

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04101* (2013.01); *G06F 2203/04112* (2013.01)

(58) Field of Classification Search
None
See application file for complete search history.

(56) References Cited

U.S. PATENT DOCUMENTS

| 8,558,802 | B2 | 10/2013 | Osoinach et al. | |
|---|---|---|---|---|
| 2003/0028346 | A1* | 2/2003 | Sinclair | G06F 3/03547 702/150 |
| 2012/0044199 | A1 | 2/2012 | Karpin et al. | |
| 2012/0050216 | A1* | 3/2012 | Kremin | G06F 3/044 345/174 |
| 2012/0262395 | A1* | 10/2012 | Chan | G06F 3/044 345/173 |
| 2013/0257781 | A1 | 10/2013 | Phulwani et al. | |
| 2014/0092031 | A1 | 4/2014 | Schwartz et al. | |
| 2014/0278173 | A1 | 9/2014 | Elia et al. | |
| 2015/0054776 | A1* | 2/2015 | Reitan | G06F 3/03545 345/174 |
| 2015/0162932 | A1* | 6/2015 | Page | G01R 27/2605 324/658 |

\* cited by examiner

*Primary Examiner* — Joseph Haley
*Assistant Examiner* — Emily Frank
(74) *Attorney, Agent, or Firm* — Osha Liang LLP

(57) ABSTRACT

A processing system for baseline management includes a sensor module comprising sensor circuitry coupled to sensor electrodes. The sensor module configured to transmit transmitter signals and receive resulting signals with at least a portion of the sensor electrodes. The processing system includes a determination module operatively connected to the sensor electrodes and configured to acquire a mutual capacitive image from the resulting signals, generate a first thermal measurement based on the mutual capacitive image, and determine a thermal rate based on the first thermal measurement. The determination module is further configured to update a proximity baseline according to the thermal rate to obtain an updated baseline.

18 Claims, 4 Drawing Sheets

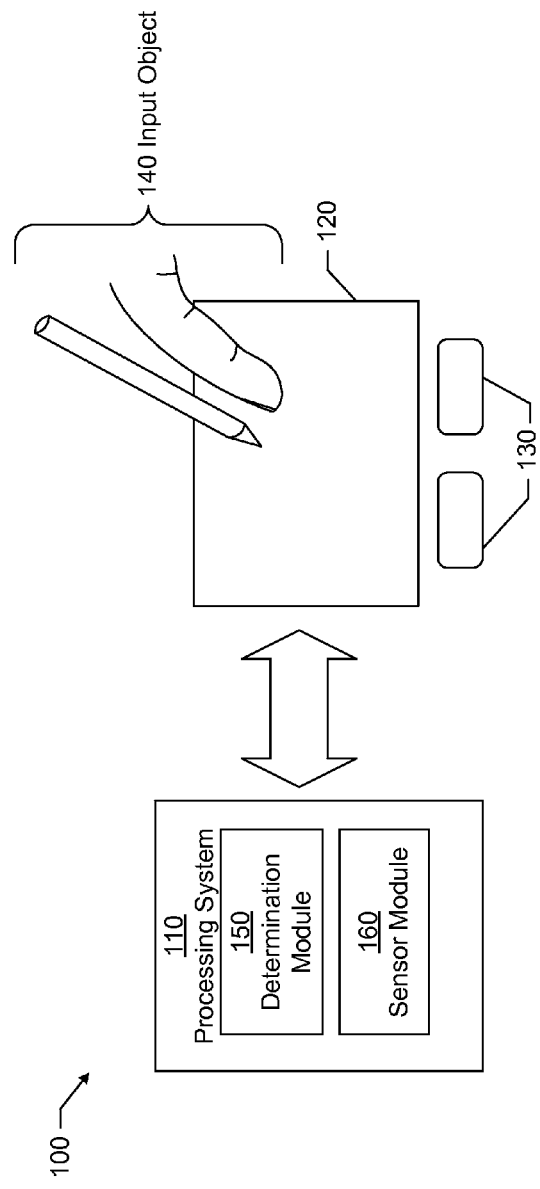
FIG. 1.1
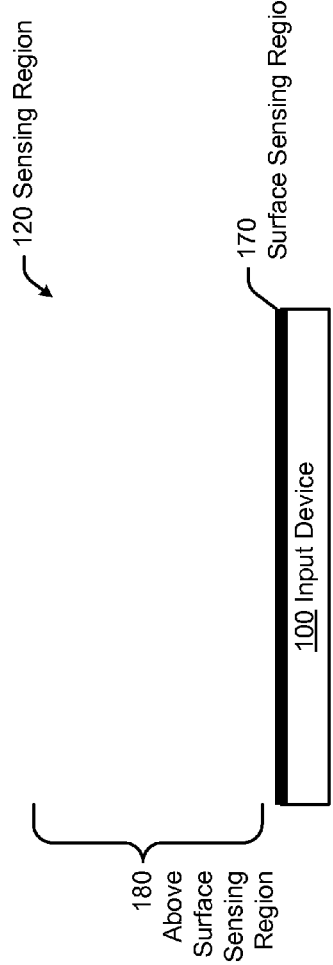
FIG. 1.2

THERMAL BASELINE RELAXATION

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for baseline management. The processing system includes a sensor module comprising sensor circuitry coupled to sensor electrodes. The sensor module configured to transmit transmitter signals and receive resulting signals with at least a portion of the sensor electrodes. The processing system includes a determination module operatively connected to the sensor electrodes and configured to acquire a mutual capacitive image from the resulting signals, generate a first thermal measurement based on the mutual capacitive image, and determine a thermal rate based on the first thermal measurement. The determination module is further configured to update a proximity baseline according to the thermal rate to obtain an updated baseline.

In general, in one aspect, embodiments relate to a method for baseline management. The method includes acquiring a mutual capacitive image from resulting signals received from sensor electrodes, generating a first thermal measurement based on the mutual capacitive image, and determining a thermal rate based on the first thermal measurement. The method further includes updating a proximity baseline according to the thermal rate to obtain an updated baseline.

In general, in one aspect, embodiments relate to an input device that includes sensor electrodes configured to generate sensing signals, and a processing system connected to the sensor electrodes. The processing system is configured to acquire a mutual capacitive image from the sensing signals, generate a first thermal measurement based on the mutual capacitive image, determine a thermal rate based on the first thermal measurement, and update a proximity baseline according to the thermal rate to obtain an updated baseline.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and:

FIGS. 1.1, 1.2, and 2 are block diagrams of an example system that includes an input device in accordance with an embodiment of the invention.

DETAILED DESCRIPTION

Figure 2:
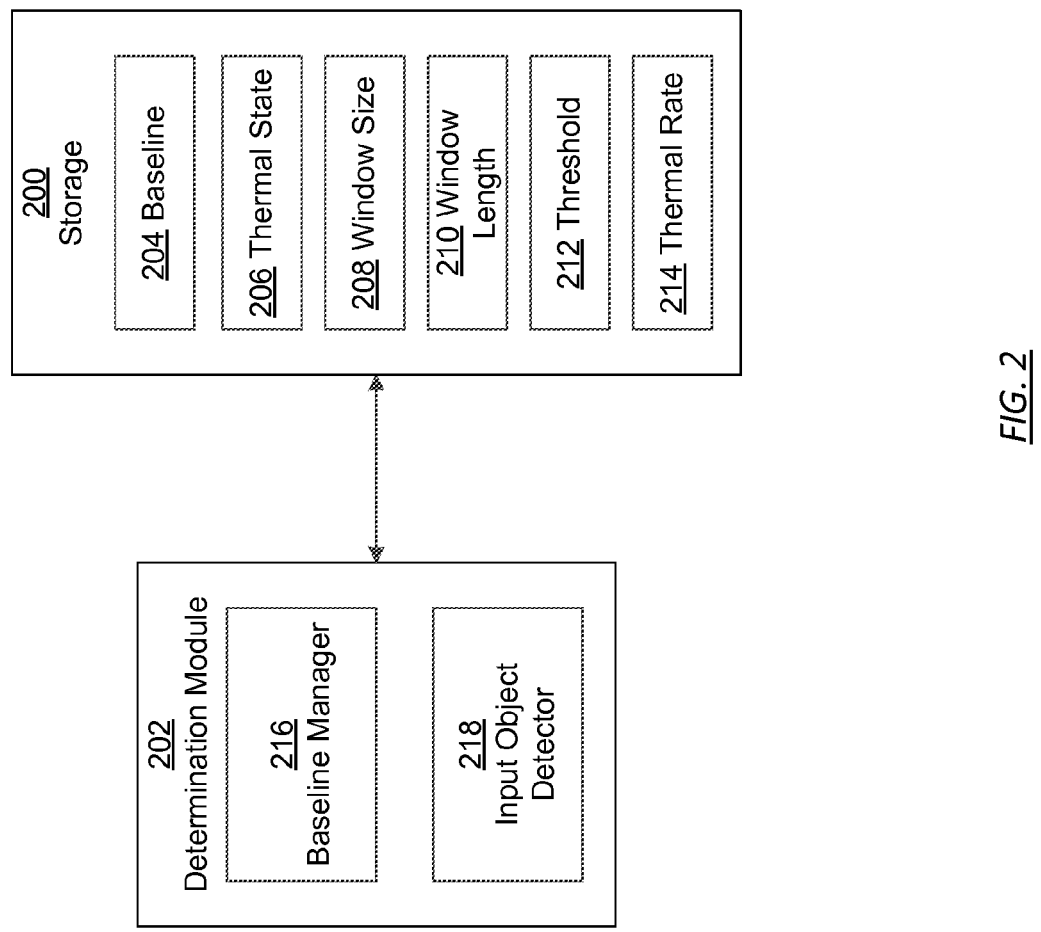

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments of the invention are directed to detecting thermal changes in a capacitive input device using mutual capacitive measurements. Based on the thermal changes, a baseline that affects whether an input object is detected is updated. In other words, the capacitive input device may have an increase in temperature when in use and cool down when not in use. The temperature variations may cause a drifting in measurements that is not reflective of an input object. One or more embodiments are directed to detecting the thermal variations using the mutual capacitive measurements, and modifying a baseline based on the thermal variations regardless of whether an input object is detected as being present.

Turning now to the figures, FIG. 1.1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input devices (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1.1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1.1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture; subsequently, the first input object and a second input object may be in the above surface sensing region, and finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

FIG. 1.2 shows an example sensing region (120) of an input device (100) in one or more embodiments of the invention. As shown in FIG. 1.2, in some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In such embodiments, the sensing region may include a surface sensing region (170) and an above surface sensing region (180).

In many embodiments, the surface sensing region (170) corresponds to a portion of the sensing region that has contact with an input surface (e.g. a touch surface) of the input device (100) and/or contact with an input surface of the input device (100) coupled with some amount of applied force or pressure. Here, the contact corresponds to a physical touching between the input object and the input surface. In various embodiments, input surfaces may be provided by surfaces of casings within which the sensor electrodes reside by face sheets applied over the sensor electrodes or any casings, etc. In such a scenario, the contact with the input surface may correspond to contact with the surfaces of casings, face sheets or any other housing of the sensor electrodes.

In contrast, in many embodiments, the above surface sensing region (180) corresponds to a portion of the sensing region that does not involve contact with the input surface. In other words, the above surface sensing region (180) does not include a portion of the sensing region that physically touches or is physically connected to the input device. The above surface sensing region (180) is distinct from, and does not overlap with the surface sensing region (170). Further, although the terms surface and above surface are used herein, the above surface sensing region (180) may be angularly offset from the surface sensing region (170). In other words, the above surface sensing region (180) may include any area that is capable of being measured by the sensing electrodes and that is distinct from and non-overlapping with the surface sensing region (170). For example, the above surface sensing region (180) may include areas that are next to the input device (100) and do not touch the input surface. In various embodiments, the surface sensing region (170) may further correspond to a portion of the sensing region that is proximate with the input surface of the input device, where the portion of the sensing region that is proximate the input surface is not comprised within the above surface sensing region (180). In many embodiments, the surface sensing region (170) corresponds to a first portion of the sensing region (120) and the above surface sensing region (180) corresponds to a second portion of the sensing region, where the first portion of the sensing region (120) is between the surface of the input device (100) and the second portion of the sensing region. Further, in one embodiment, the surface sensing region (170) and the above surface sensing region (180) are configurable parameters, such that portions of the sensing region that are comprised within in each are a configurable parameter.

Returning to FIG. 1.1, the input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may by a substantially constant voltage and in various embodiments, the reference voltage may be system ground. In some embodiments, transmitter sensor electrodes may both be modulated. The transmitter electrodes are modulated relative to the receiver electrodes to transmit transmitter signals and to facilitate receipt of the resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1.1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above-described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1.1, the processing system (110) may include a determination module (150) and a sensor module (160). The determination module (150) may include functionality to determine when at least one input object is in a sensing region, determine a signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1.1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures. The identified gestures may include, for example, mode changing gestures, and mode changing modules for changing operation modes. Further, the various modules may be combined in separate integrated circuits. For example, a first module may be comprised at least partially within a first integrated circuit, and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1.1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally, regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1.1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1.1 shows a configuration of components, other configurations may be used without departing from the scope of the invention. For example, various components may be combined to create a single component. As another example, the functionality performed by a single component may be performed by two or more components.

FIG. 2 shows a block diagram of a system in accordance with one or more embodiments of the invention. As shown in FIG. 2, the system includes storage (200) and a determination module (202). Both of these components are discussed below.

Storage (200) corresponds to any hardware and/or software storage mechanism for storing data. For example, storage may correspond to hardware registries, data structures or any other storage mechanism or combination thereof. The storage (200) includes functionality to store a baseline (204), a thermal state (206), a window size (208), a window length (210), a threshold (212), and a thermal rate (214). Each of these is described below.

In one or more embodiments of the invention, the baseline (204) is a set of values representing estimated background capacitance of the sensing region when no input objects are detected. In other words, the baseline (204) includes a separate value to adjust each capacitive measurement to account for noise and thermal variation of the capacitive input device. The baseline may be associated with a relaxation rate defining a baseline relaxation. In one or more embodiments of the invention, baseline relaxation refers to the transitioning from a baseline to another baseline. Baseline relaxation adjusts the baseline to account for the changes to the background capacitance based on thermal variation, environmental, or other operating condition changes. In other words, the baseline relaxation may be performed by updating the current baseline according to a function of capacitive measurements. The baseline relaxation rate is the rate of change at which the baseline (204) is updated to account for the change in accordance with some embodiments.

In one or more embodiments of the invention, the thermal state (206) is a variable that maintains a value representing the detected thermal measurement in the capacitive input device. In one or more embodiments of the invention, the value of the thermal state is an average over several frames in a window of frames. The thermal state provides a mechanism for retaining the average from a prior window in accordance with one or more embodiments of the invention.

Each frame is a time window during which a single capture of the status of the sensing region with respect to the presence any input objects is performed. During a frame, any and all input objects may be approximated as being stationary. In other words, the time window of the sensing frame is so short as to be effectively instantaneous to a human operator. In one or more embodiments of the invention, at the end of the frame, a report may be transmitted to other components of the processing system, input device, host system, or other device, or combination thereof. Each report includes positional information regarding any input objects in the sensing region.

In one or more embodiments of the invention, the window size (208) is the number of frames before determining whether to change the relaxation rate of the baseline. In other words, in some embodiments, rather than constantly adjusting the relaxation rate, the relaxation rate may be adjusted only every defined number of frames as defined by the window size (208). In one or more embodiments of the invention, the window size (208) may be configurable. In other embodiments, the window size (208) is a static value. In other embodiments, the relaxation rate may be constantly adjusted. The window length (210) is the number of frames for which measurements have been acquired in the current window.

In one or more embodiments of the invention, the threshold (212) is a value representing a minimal amount of thermal variation before the relaxation rate is adjusted to account for thermal variation. In one or more embodiments of the invention, the threshold may be configurable. In other embodiments, the threshold is a static value.

In one or more embodiments of the invention, the thermal rate (214) is the amount of adjustment to perform. In other words, the thermal rate is a calculated value defining the amount of adjustment to perform over a defined time period.

Continuing with FIG. 2, the determination module (202) includes a baseline manager (216) and an input object detector (218). The baseline manager (216) includes functionality to manage the baseline (204). In particular, the baseline manager (216) includes functionality to determine the thermal variation based on mutual capacitive measurements, determine the thermal rate (214) for updating the baseline (204) and update the baseline (204) accordingly. Management of the baseline is discussed below with reference to FIG. 4.

The input object detector (218) includes functionality to detect input objects in the sensing region using the current baseline. In other words, the input object detector (218) includes functionality to obtain measurements of the sensing region, adjust the measurements based on the current baseline, and determine positional information for any input objects in the sensing region using the measurements. Detecting input objects is discussed below with reference to FIG. 3.

Figure 3:
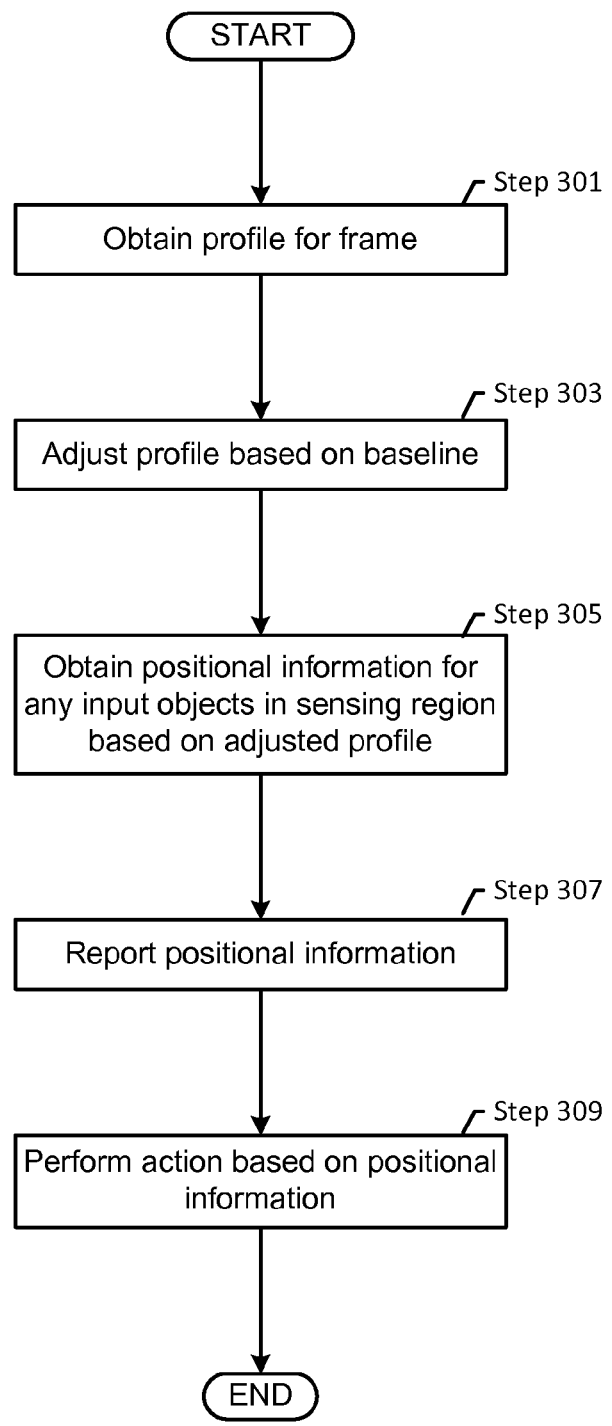
FIGS. 3 and 4 show flowcharts in accordance with one or more embodiments of the invention.
Figure 4:
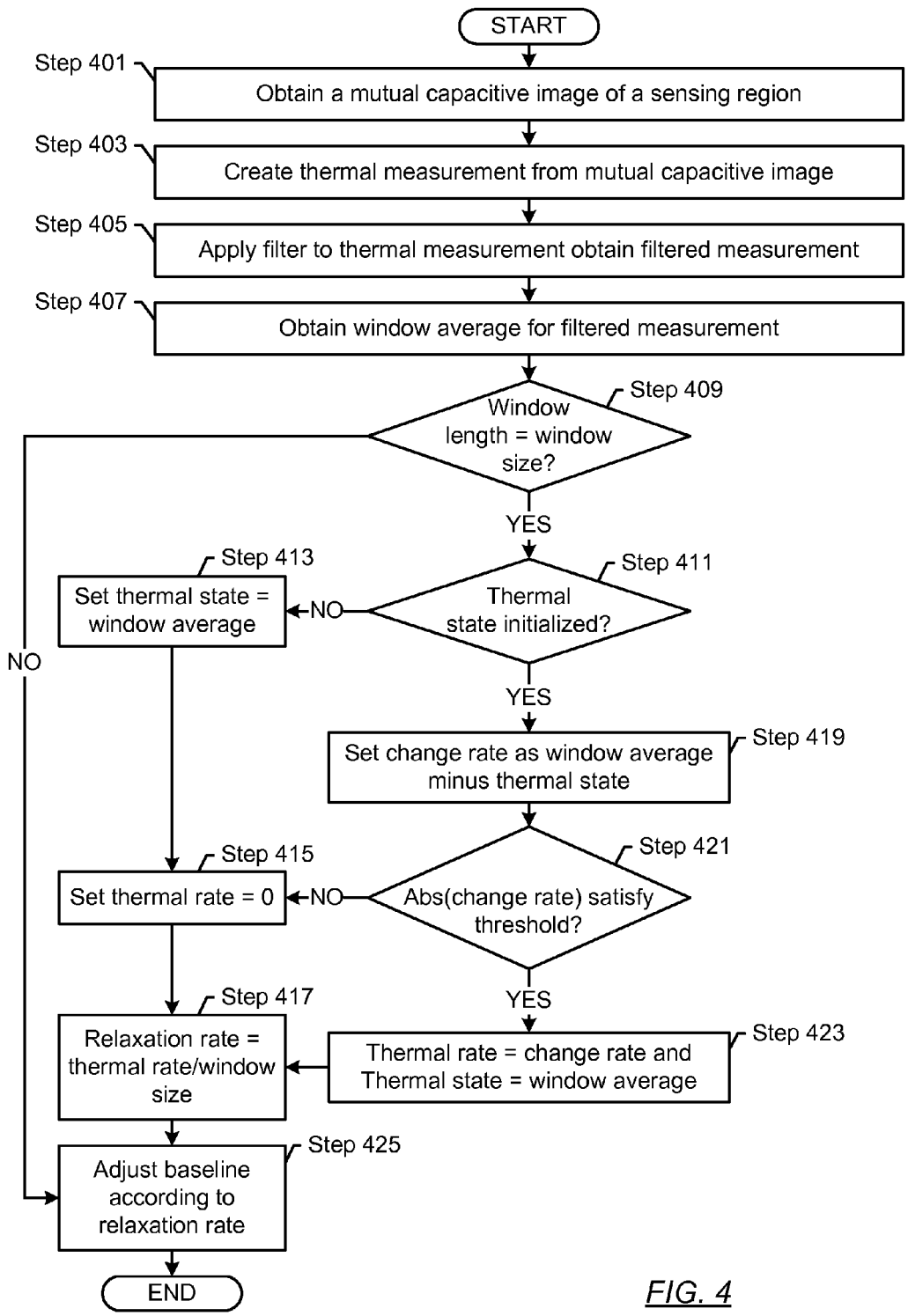

FIGS. 3 and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart for detecting input objects in accordance with one or more embodiments of the invention. In some embodiments, one or more of the steps described in FIG. 3 may be omitted. In Step 301, a profile corresponding to a frame is obtained. Obtaining a profile may include determining a measured data value corresponding to a resulting signal (or sensing signal) received with each sensor electrode. The resulting signals (or sensing signals) may be received at once or over a span of time. For example, the sensor electrodes may receive the resulting signals at one time and output the corresponding measured data values at one time. By way of another example, the sensor electrodes may receive resulting signals and output corresponding data row by row or column by column. Once the measured data values are determined, the measured data values may be grouped into the profile. Pre-processing may or may not be performed on the measured data values or on the profile before the profile is obtained in one or more embodiments of the invention.

The term "profile" is used herein in the general sense and in various embodiments. While a profile may be shown and discussed as corresponding to an analog representation of data, this is not intended to be limiting, and they may also be discrete values. Further, a profile may also be alternatively referred to as a projection or a combined measurement.

In Step 303, the profile is adjusted based on the baseline in accordance with one or more embodiments of the invention. In one or more embodiments of the invention, each value in the profile may be adjusted based on the corresponding value in the baseline. Spatial and/or temporal filtering may be applied to the profile to reduce noise.

In Step 305, positional information is obtained for any input objects in the sensing region. In particular, the determination module may obtain the positional information, for example, by calculating a signal to noise ratio for the profile using the adjusted profile. If the signal to noise ratio satisfies a detection threshold, then one or more input objects may be determined to be present. Obtaining positional information may include spatially segmenting the profile when multiple peak values are present and identifying, for each segment, a position of each peak. Additional actions may be performed to identify the position of any input object in the sensing region.

In Step 307, the positional information is reported. In one or more embodiments of the invention, the determination module may report the positional information directly or indirectly to the operating system. For example, if the determination module is on the input device, then the determination module may report the positional information to firmware, which reports the positional information to the operating system. By way of another example, if the determination module is in whole or in part on the firmware, then the determination module may report the positional information to the operating system.

In Step 309, an action is performed based on the calculated positional information. The action may be to change a state of an application and/or the host device. For example, the action may be to change the display of a graphical user interface (GUI), such as showing that a cursor or pointer has move, show certain GUI component highlighted, perform an action defined by GUI component corresponding to the position (e.g., transition to another screen, make a phone call, or perform another GUI component defined action), or perform another action.

FIG. 4 shows a flowchart for baseline management based on thermal drift in accordance with one or more embodiments of the invention. In one or more embodiments of the invention, prior to performing at least some of the steps shown in FIG. 4, at least some of the states, such as window length, change rate, and window average may be initialized or reset. Additionally, in some embodiments, one or more of the steps described in FIG. 4 may be omitted.

In Step 401, a mutual capacitive image of the sensing region is obtained. For example, the sensor module may trigger the transmitter electrodes to transmit transmitter signals. Resulting signals may be received by receiver electrodes. Measurements may be acquired from the resulting signals. Pre-processing may be performed on the measurements to obtain the capacitive image.

In Step 403, a thermal measurement may be created from the mutual capacitive image. In one or more embodiments, a mathematical function is applied to the measurements in the mutual capacitive image to obtain a value for the thermal measurement. For example, the mathematical function may be an average of the measurements in the mutual capacitive image. Other mathematical functions may be applied without departing from the scope of the invention.

Further, in one or more embodiments of the invention, the aggregate value is related to the absolute measurements. In other words, the aggregate value is an indication of the responsiveness of the mutual capacitive measurements to thermal variation. The aggregate value is related to absolute capacitive measurements to determine the effect of the thermal variation on the absolute capacitive measurement. The relationship may be by a factor that is multiplied, an addition or subtraction factor, or through one or more mathematical operations. Determining the relationship may be based, for example, on experimentation. For example, experimentation with the particular input device may define the relationship between the thermal variations as reflective in the mutual capacitive measurement with the thermal variation as reflective in the absolute capacitive measurement.

Although not presented above, rather than a single thermal measurement for the sensing region, multiple thermal measurements may be acquired. For example, projections of mutual capacitive image along each axis may be acquired. Similar to the above, a thermal measurement for the absolute capacitive sensing may be obtained based on the corresponding value in the projection of the mutual capacitive image. In other words, for each grouping of one or more points, one or more points in the profile may be mapped to the corresponding point in the projection, and a thermal measurement may be determined for the one or more points in the profile. Subsequent processing may be performed separately for each grouping of one or more points. Thus, one or more embodiments may be able to account for spatial variations in thermal variations, such as when the center or side of the sensing region heats up or cools down quickly while the reminder of the sensing regions stays at or near equilibrium.

In Step 405, a filter is applied to the thermal measurement to obtain a filtered measurement. For example, the one or more filters may include a low or band pass filter. A low pass filter may be used to remove noise. A band pass filter may be used to minimize transient responses. Whether Step 405 is performed may be dependent on noise and latency introduced by the filtering process. In particular, if the environment is subject to more noise, then more filtering may be applied. If the filtering introduces more than a threshold amount of latency, then less filtering may be applied.

In Step 407, a window average is obtained for the filtered measurement in accordance with one or more embodiments of the invention. For the initial frame, the window average may be the initially acquired filtered measurement. After the first frame, the window average may be calculated as a function of the prior window average and the current filtered measurement. For example, the window average may be equal to $(((L-1)/L)*P)+(C/L)$, where L is window length, P is prior window average, and C is current filtered measurement. Other techniques for calculating window average may be used without departing from the scope of the invention.

In Step 409, a determination is made whether the window length is equal to the window size in accordance with one or more embodiments of the invention. If the window length is not equal to the window size, then the relaxation rate is not updated. In other words, in Step 425, the baseline is adjusted according to the current relaxation rate, if any. The steps of FIG. 4 may be repeated for the next frame starting with Step 401. At this stage, the states may not be reset when repeating the steps of FIG. 4. Alternatively, if the window length is equal to the window size, then the flow may continue to determine whether to update the baseline based on the window average.

In Step 411, a determination is made whether the thermal state is initialized in accordance with one or more embodiments of the invention. In other words, a determination is made whether a value has been set for the thermal state. In one or more embodiments of the invention, for the initial window, such as when the baseline manager is initially activated, thermal baseline management is activated, or following a reset of the baseline manager, or other time, the thermal state is not initialized and flow proceeds to Step 413.

If the thermal state has not been initialized, then the thermal state may be initialized to the window average in Step 413. In other words, the initial value for the thermal state may be the window average for the current window. Further, the thermal rate is set as equal to zero in Step 415. Thus, when the relaxation rate is calculated in Step 417, no relaxation is performed and the baseline is not adjusted in Step 425.

Alternatively, if in Step 411, the thermal state is initialized, such as after the initial window, the flow may proceed to Step 419 to obtain the change rate. In Step 419, the change rate may be calculated as the window average minus the thermal state. In other words, the change rate reflects the change in the thermal value from the prior window.

In Step 421, a determination is made whether the absolute value of the change rate satisfies a threshold. The absolute value of the change rate may satisfy the threshold when the absolute value of the change rate is strictly greater than or both greater than or equal to the threshold. By using the absolute value, one or more embodiments may trigger an adjustment of the baseline regardless of whether the temperature is increasing or decreasing.

If the absolute value of the change rate does not satisfy a threshold, then no thermal variation may be determined to exist. In such a scenario, the thermal rate may be set to zero in Step 415. Thus, when the relaxation rate is calculated in Step 417, no relaxation is performed and the baseline is not adjusted in Step 425.

Alternatively, if the absolute value of the change rate satisfies a threshold, then the flow proceeds to Step 423 to trigger an update to the relaxation rate. In Step 423, the thermal rate may be set as equal to the change rate and the thermal state is set as equal to the window average. In other words, the change rate may be used to define the amount of adjustment to the baseline. Further, the thermal state is updated in order to track the prior window average for the next window in accordance with one or more embodiments of the invention.

In Step 417, the relaxation rate may be set as the thermal rate divided by the window size. Further, in Step 425, the baseline is adjusted according to the relaxation rate in accordance with one or more embodiments of the invention. While the baseline is being adjusted over the course of several frames, the steps of FIG. 4 may be repeated.

Adjusting the baseline may be performed as follows. Relax amounts may be set as equal to the delta multiplied by the minimum of the relaxation rate and the absolute value of delta, where delta represents the values in the baseline adjusted 'delta' profile. The baseline may be adjusted by adding the current baseline to the relax amount to obtain a new baseline. Thus, using an adjusted baseline, the input object may be detected regardless of whether thermal drift exists in the measurements and whether an input object is in the sensing region.

Although FIG. 4 shows one example flow for baseline management, variations may exist and be used without departing from the scope of the invention. For example, a different equation may be used in Step 417 to calculate the relaxation rate. By way of a more specific example, the relaxation rate may be calculated additionally based on other factors that are not associated with thermal measurements. By way of another example, the thermal state may be set to the window average regardless of whether the absolute value of the change rate satisfies the threshold. Thus, FIG. 4 shows only an example embodiment for baseline management based on the thermal variation. Other embodiments that are not shown exist and may be used without departing from the scope of the claims.

The following example is for explanatory purposes only and not intended to limit the scope of the invention. The following table shows an example timeline of a user using an input device, causing the touchscreen to have an increase in temperature and the resulting actions by the baseline relaxation. In the following example, consider the scenario in which the threshold is set at two and the window size is set to equal sixty. The values of the threshold and window size are for example purposes only.

TABLE 1

Example

| Time | Scenario | Results |
|---|---|---|
| Time 0 | User starts up device. The device is at room temperature. | Window average = 0<br>Change rate = 0<br>Thermal rate = 0<br>Thermal state = 0<br>Relaxation rate = 0 |
| Time 1 | As user uses device to play hovering game (i.e., a finger present in sensing region), the device heats up, requiring thermal relaxation of the baseline to compensate for the positive temperature change so that no thermally-induced fictitious fingers are detected once the finger is no longer present in the sensing region (Time 2 scenario). | Window average = 3<br>Change rate = 3 − 0 = 3<br>Thermal rate = 3, since \|3\| >=2<br>Thermal state = 3<br>Relaxation rate = 3/60 |
| Time 2 | User stops playing game (i.e., no finger present in sensing region), the device is hot, but cooling | Window average = 0.5<br>Change rate = 0.5 − 3 = −2.5<br>Thermal rate = −2.5, |

TABLE 1-continued

Example

| Time | Scenario | Results |
|---|---|---|
| | down, requiring thermal relaxation to the baseline to compensate for the negative temperature change so that any subsequent fingers present in the sensing region are not thermally attenuated. | since \|−2.5\| >=2<br>Thermal state = 0.5<br>Relaxation rate = −2.5/60 |
| Time 3 | The device equilibrates near room temperature, requiring no thermal relaxation. | Window average = 0.1<br>Change rate =<br>0.1 − 0.5 = −0.4<br>Thermal rate = 0,<br>since \|−0.4\| <2<br>Thermal state = 0.5, unchanged<br>Relaxation rate = 0 |

As shown in the example table, at time 0, a user turns on the user's input device. When the user starts the device, the window average, change rate, thermal rate, thermal state, and relaxation rate are all equal to 0. At time 1, the user uses the device to start playing a hovering game. In other words, the finger is present in the sensing region. The use of the hovering game is only for example purposes. Any action that may cause the device to heat up may exist. Further, the device starts to heat up, thereby needing a relaxation to compensate for the temperature change.

For time 1, through the course of heating up, consider the scenario in which the window average is calculated to be 3. The change rate, or window average minus the thermal state from time 0 is 3. Because 3 is greater than 2, which is the threshold, the relaxation rate is updated. Thus, the relaxation rate is set as the thermal rate (i.e., 3 in the example) divided by window size (i.e., 60 in the example). In other words, the baseline relaxation rate is set as 3/60.

Continuing with the example, at time 2, the user stops playing the game and the input device starts to cool down. In the example at time 2, consider the scenario in which the window average is determined to be 0.5. Thus, the change rate is −2.5. Because 2.5 is greater than 2, the thermal rate is −2.5 and the resulting relaxation rate is −2.5/60. In other words, over the course of the next 60 frames, the baseline is updated at a rate of −2.5/60 per frame.

At time 3, the user has stopped playing the game for a while and the device enters into an equilibrium. The window average is determined to be 0.1 and the change rate from time 2 is −0.4. Because 0.4 is less than 2, no relaxation is performed. In other words, the relaxation rate is set as 0.

As shown in the example, one or more embodiments provide a mechanism to determine the thermal variation regardless of whether an input object is present based on mutual capacitive measurements. The thermal variation is then used to determine the relaxation rate to update the baseline for the absolute capacitive measurements.

The example above is only an example. Numbers in the example are merely used for example purposes only and are not intended to limit the scope of the invention. In particular, the actual values used may vary widely from those shown in the example.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for baseline management, comprising:
   a sensor module comprising sensor circuitry configured to be coupled to a plurality of sensor electrodes, the sensor module configured to transmit transmitter signals and receive resulting signals with at least a portion of the plurality of sensor electrodes; and
   a determination module operatively connected to the plurality of sensor electrodes and configured to:
      acquire a mutual capacitive image from the resulting signals,
      generate a first thermal measurement based on the mutual capacitive image,
      determine a thermal rate based on the first thermal measurement, the thermal rate being a calculated value defining an amount of adjustment to perform over a defined time period, and
      update a proximity baseline according to the thermal rate to obtain an updated baseline.

2. The processing system of claim 1, wherein the determination module is further configured to:
   perform input object detection in a sensing region using the updated baseline.

3. The processing system of claim 1, wherein the determination module is further configured to:
   determine a first aggregated measurement at least from the first thermal measurement, wherein determining the thermal rate is performed based on the first aggregated measurement.

4. The processing system of claim 3, wherein determining the first aggregated measurement comprises:
   applying a filter to the first thermal measurement to obtain a filtered measurement,
   wherein the thermal rate is based on the filtered measurement.

5. The processing system of claim 3, wherein determining the first aggregated measurement comprises:
   performing a window averaging of a plurality of thermal measurements to obtain a window average,
   wherein the plurality of thermal measurements is obtained from a plurality of mutual capacitive images.

6. The processing system of claim 5, wherein the determination module is further configured to:
   determine a relaxation rate based on the thermal rate and a window size, and wherein the proximity baseline is updated according to the relaxation rate.

7. The processing system of claim 3, wherein the determination module is further configured to:
   obtain a change rate between the first aggregated measurement and a second aggregated measurement, wherein the second aggregated measurement is based on a second thermal measurement obtained prior to the first thermal measurement, determine that the change rate satisfies a threshold,
wherein determining the thermal rate comprises setting the thermal rate to be equal to the change rate based on the change rate satisfying the threshold.

8. A method for baseline management comprising:
acquiring a mutual capacitive image from resulting signals received from sensor electrodes;
generating, by processing circuitry, a first thermal measurement based on the mutual capacitive image;
determining a first aggregated measurement at least from the first thermal measurement,
wherein determining the first aggregated measurement comprises:
applying a filter to the first thermal measurement to obtain a filtered measurement,
determining, by the processing circuitry, a thermal rate based on the filtered measurement, the thermal rate being a calculated value defining an amount of adjustment to perform over a defined time period; and
updating, by the processing circuitry, a proximity baseline according to the thermal rate to obtain an updated baseline.

9. The method of claim 8, further comprising:
performing, by the processing circuitry, input object detection in a sensing region using the updated baseline.

10. The method of claim 8, wherein determining the first aggregated measurement comprises:
performing a window averaging of a plurality of thermal measurements to obtain a window average,
wherein the plurality of thermal measurements is obtained from a plurality of mutual capacitive images.

11. The method of claim 10, further comprising:
determining a relaxation rate based on the thermal rate and a window size, and wherein the proximity baseline is updated according to the relaxation rate.

12. The method of claim 8, further comprising:
obtaining a change rate between the first aggregated measurement and a second aggregated measurement, wherein the second aggregated measurement is based on a second thermal measurement obtained prior to the first thermal measurement, and
determining that the change rate satisfies a threshold,
wherein determining the thermal rate comprises setting the thermal rate to be equal to the change rate based on the change rate satisfying the threshold.

13. An input device comprising:
a plurality of sensor electrodes configured to generate sensing signals; and
a processing system connected to the plurality of sensor electrodes and configured to:
acquire a mutual capacitive image from the sensing signals,
generate a first thermal measurement based on the mutual capacitive image,
determine a thermal rate based on the first thermal measurement, the thermal rate being a calculated value defining an amount of adjustment to perform over a defined time period, and
update a proximity baseline according to the thermal rate to obtain an updated baseline.

14. The input device of claim 13, wherein the processing system is further configured to:
determine a first aggregated measurement at least from the first thermal measurement,
wherein determining the thermal rate is performed based on the first aggregated measurement.

15. The input device of claim 14, wherein determining the first aggregated measurement comprises:
applying a filter to the thermal measurement to obtain a filtered measurement,
wherein the thermal rate is based on the filtered measurement.

16. The input device of claim 14, wherein determining the first aggregated measurement comprises:
performing a window average of a plurality of thermal measurements to obtain a window average,
wherein the plurality of thermal measurements is obtained from a plurality of mutual capacitive images.

17. The input device of claim 16, wherein the processing system is further configured to:
determine a relaxation rate based on the thermal rate and a window size, and wherein the proximity baseline is updated according to the relaxation rate.

18. The input device of claim 14, wherein the processing system is further configured to:
obtain a change rate between the first aggregated measurement and a second aggregated measurement, wherein the second aggregated measurement is based on a second thermal measurement obtained prior to the first thermal measurement,
determine that the change rate satisfies a threshold,
wherein determining the thermal rate comprises setting the thermal rate to be equal to the change rate based on the change rate satisfying the threshold.

* * * * *